May 2, 1944.  R. D. BOURNE  2,347,658
ICE CREAM GOBLET
Filed Feb. 19, 1943
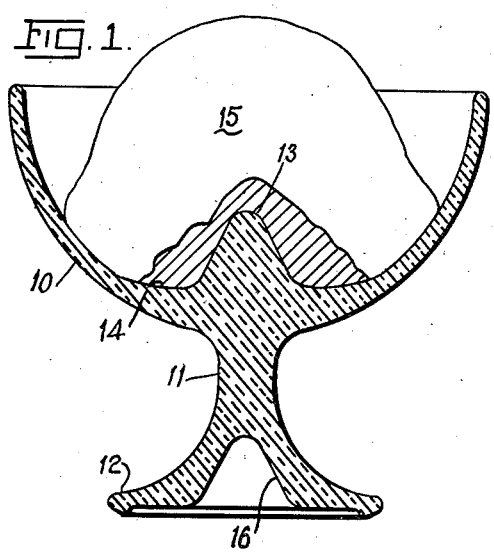
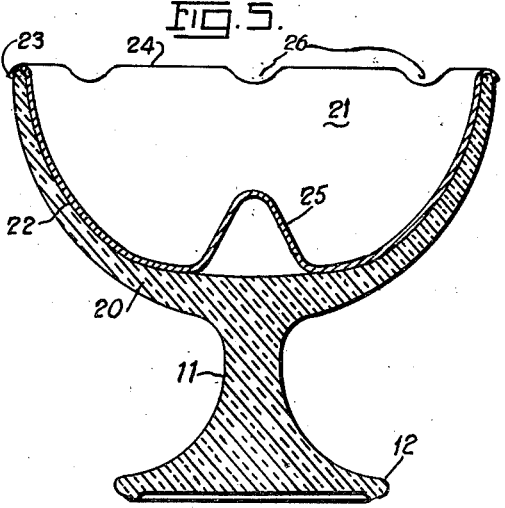
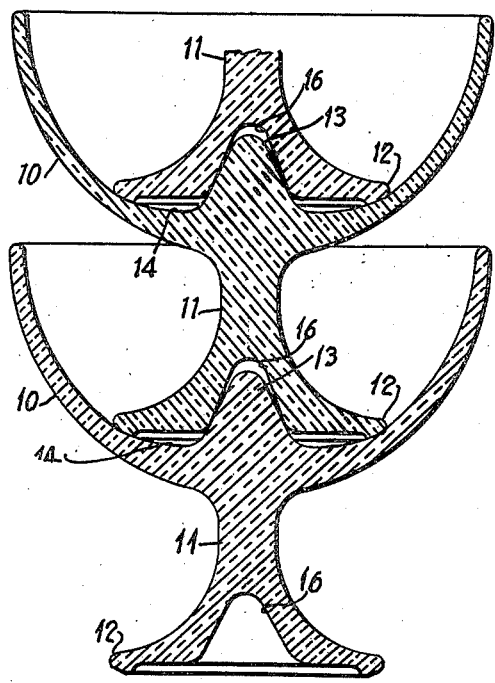
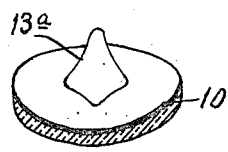
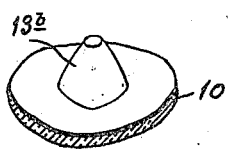
INVENTOR
RAYMOND D. BOURNE,
BY
ATTORNEYS Patented May 2, 1944

2,347,658

UNITED STATES PATENT OFFICE 2,347,658

ICE CREAM GOBLET

Raymond D. Bourne, Middletown, Ohio

Application February 19, 1943, Serial No. 476,375

5 Claims. (Cl. 65—15)

This invention relates to goblets or dishes that are adapted for use in serving various substances that are difficult to handle and particularly substances that have a tendency to move around in a dish or goblet while a person is removing portions thereof for consumption. A substance that is particularly hard to handle is ice cream because the outer surface has a tendency to soften and melt while the inner surface remains hard so that the ice cream in a dish will slide around the dish when portions of the body in the dish are being removed. The conventional manner of serving substances, such as ice cream, is to place the desired portion in a goblet or dish that has a smooth interior surface. Such an arrangement causes particular difficulty when the ice cream is exceedingly hard.

An object of the invention is to provide an improved form of dish or goblet for serving various substances that have a tendency to slide in the dish that is constructed and arranged in a manner that the substance will be retained in position in the dish so that individual portions can be readily removed from the serving in the dish.

Another object of the invention is to provide a dish or goblet for serving various substances that has a raised portion in the bottom of the dish that will enter the mass of the serving of the substances in the dish so that it will be prevented from movement when individual portions are being removed from the serving.

It is still a further object of the invention to provide a serving container for various substances that is constructed and arranged in a manner that a portion of the container will enter the mass of the substance being served and thus retain the same in position in the container.

It is a still further object of the invention to provide a serving container constructed in accordance with foregoing objects that is constructed and arranged in a manner so that a plurality of the containers can be stacked one upon the other for storage purposes.

Further objects and advantages will become apparent from the drawing and the following description.

Referring to the drawing:

Figure 1 is a vertical cross-sectional view through a serving container constructed in accordance with the teachings of this invention, and showing a mass of a substance therein, portions of which may be removed for consumption.

Figure 2 is a vertical cross-sectional view through a plurality of the serving containers constructed in accordance with this invention showing the manner in which they can be stacked for storage purposes.

Figures 3 and 4 are perspective elevational views of a portion of the bottom of a serving container illustrating different forms of the protrusion that can extend upwardly from the bottom of the serving container to hold the mass of a substance in position in the container.

Figure 5 is a vertical cross-sectional view through a somewhat conventional serving container or goblet that is provided with serving container adapter positioned within the conventional container for adapting it for use according to the teachings of this invention.

In this invention the serving container consists of a concave dish-like body 10 that is provided with a stem 11 and a foot or pedestal 12. Conventional dishes or goblets for serving substances such as ice cream are provided with a smooth interior surface so that the concave surface of the body 10 is not readily adaptable to prevent movement of a serving of ice cream within the dish when individual portions are being removed from the serving.

In this invention however a vertically extending protrusion 13 is provided in the bottom wall 14 of this body 10. As will be seen in Figure 1 this protrusion 13 extends upwardly from the bottom wall 14 a substantial distance so that when a serving of ice cream 15, or other substance, is placed within the dish, or goblet, it will be impaled upon the protrusion 13 so that the serving 15 can not readily move around in the dish. The protrusion 13, as shown in Figure 1, is conical in contour but it may be provided with any desired contour that is arranged to enter a mass of a serving placed within the body 10 of the goblet. As shown in Figure 3 the protrusion 13a is in the form of a three sided triangle, while in Figure 4 the protrusion 13b is in the form of a four sided pyramid having slightly convex sides. The exact form of the protrusion in the bottom wall of the dish or goblet is not of particular importance except that it should be of sufficient pointedness at the top so that when a serving of a substance is placed within the dish or goblet that the protrusion will enter the substance and thus retain the same in position in the goblet.

The protrusions 13, 13a, 13b can also have a contour to prevent axial rotation of a substance within the goblet upon the protrusion. Also, configurations as the three sided triangle and the pyramidal form of protrusion will prevent axial rotation of the substance in the goblet as well as movement of the substance upwardly along the side wall of the goblet when individual portions are being removed from the serving.

It will be readily apparent from the foregoing description that when a serving of a substance is placed within the dish or goblet that it will be held relatively stationary therein and will be prevented from sliding upwardly along the side walls of the concave body 10 and will thus permit relatively easy removal of individual portions from the serving.

In conventional goblets the foot or pedestal of the goblet can be readily disposed within the interior of another goblet so that the foot or pedestal will support a second goblet within another and thereby stack them for storage purposes. However, the conventional foot for the goblet would not suffice in this invention because the protrusion 13 would be engaged by the foot of the goblet and thereby prevent the same from resting in another goblet in a secure manner, unless the foot was substantially the same size as the interior of the goblet.

To alleviate this difficulty the foot 12 of the goblet of this invention is provided with a recess 16 that is of substantially the same size as the protrusion 13. Thus when the foot 12 of one goblet is placed within the body 10 of another the recess 16 will be disposed over the protrusion 13 so that the goblets will thus stack for storage purposes. Also, this arrangement provides a means whereby the goblets are more securely held in stacked position because the protrusion 13 extending into the recess 16 provides a central anchor for the foot 12 of the goblet, thereby preventing the foot 12 from sliding sidewise in the body 10 of the goblet and thus prevent tilting of one goblet within another when they are in staced position.

While there has been shown and described only a single protrusion 13 provided in the bottom wall 14 of the body 10 of the goblet, or dish, it is to be understood that additional protrusions may be provided in the bottom wall 14, if it is so desired. The co-axial position of the protrusion 13 above the stem 11 of the goblet is not essential to the successful use of this invention but is an extremely convenient location for the protrusion because it permits relatively easy manufacture of the product, the protrusion 13 and the stem 11 of the goblet being formed at the same time and by co-axial operations. Also, a single central protrusion, such as that shown in the drawing, is more decorative than a plurality of protrusions and is more convenient from the standpoint of removal of all of the serving of the substance placed within the body 10 of the goblet.

In Figure 5 there is shown an adaptation of a conventional goblet 20 for use in the manner heretofore described with regards to the goblet shown in Figure 1. In this figure there is shown an adapter receptacle 21 that may be positioned within the concave body 22 of the goblet 20. The receptacle 21 can be made in any suitable form to fit the internal contour of the body of any goblet and can be made of any number of materials such as paper, plastic, or others depending upon whether or not the receptacle 21 is to be a disposable receptacle or a permanent receptacle to be re-used after proper cleansing.

The receptacle 21 is provided with a flange 23 around the upper edge thereof that is adapted to overlap, or overlie, the upper edge 24 of the goblet 20 whereby the receptacle 21 is retained in a stationary position within the body 22 of the goblet and prevented from sliding sidewise within the concave surface of the goblet 20. The receptacle 21 is provided with a protrusion 25 in the bottom wall thereof that may have a contour similar to those heretofore described with regard to the protrusion 13 or may have any other suitable contour.

It may thus be seen that the receptacle 21 provides means whereby any conventional goblet that is being used for serving ice cream today can be adapted to be used in accordance with the teachings of this invention and to improve the use of these goblets without requiring the necessity of their complete replacement in order to obtain the advantages of this invention.

Many goblets that are used for serving ice cream are provided with a decorative irregular edge. Therefore the flange 23 of the receptacle 21 may be provided with an irregular edge to substantially match the irregular edge in the goblet whereby the receptacle 21 would be prevented from rotation relative to the axis of the goblet. To illustrate the manner in which the receptacle 21 could be made to conform to the contour of the edge of the goblet, recesses 26 may be provided in the flange 23 to engage similar and co-operating recesses in the edge 24 of the goblet.

While the form of the device disclosed and described herein constitutes a preferred form, yet it is to be understood that the device is capable of physical alterations without departing from the spirit of the invention and that all modifications as fall within the scope of the appended claims are intended to be included herein.

Having thus fully described my invention, what I claim as new and desire to secure by Letters Patent is:

1. In a receptacle for serving a solid or semi-solid substance, a concave wall means adapted to support a substance to be served, means extending radially inwardly from said wall means upon which a substance is adapted to be impaled to prevent movement of the substance relative to the wall means, and flange means extending from said wall means for supporting the receptacle within a container.

2. In a receptacle for serving a solid or semi-solid substance, a concave wall means adapted to support a substance to be served, means extending radially inwardly from said wall means upon which a substance is adapted to be impaled to prevent movement of the substance relative to the wall means, and flange means extending from said wall means for supporting the receptacle within a container, said flange means being constructed and arranged to prevent movement of said receptacle relative to said container.

3. In a receptacle for serving a solid or semi-solid substance, a concave wall means adapted to support a substance to be served, means extending radially inwardly from said wall means upon which a substance is adapted to be impaled to prevent movement of the substance relative to the wall means, and flange means extending from said wall means for supporting the receptacle within a container, said flange means being constructed and arranged to prevent axial and radial rotation of said receptacle in said container.

4. In a receptacle for serving solid or semi-solid substances, a semi-spherical wall for supporting a substance, means extending radially inwardly of said receptacle from said wall upon which a substance is adapted to be impaled to prevent movement thereof in a manner that the substance is prevented from sliding upwardly along the wall of the receptacle, and flange means on said wall means adapted to engage the wall of a supporting member for preventing movement of said receptacle relative to said supporting member.

5. A serving goblet having a body supported upon a stem extending from a foot, a protrusion extending upwardly from the body of the goblet upon which a substance is adapted to be impaled to prevent movement of a substance within the body in a manner that the substance is prevented from sliding upwardly along the body when individual portions are being removed from the substance, and a recess in the foot of the goblet of substantially the same contour as said protrusion to permit the foot of one goblet to be placed within the body of another goblet and thereby stack the same with said protrusion extending within said recess to prevent movement of said foot relative to the body when supported therein.

RAYMOND D. BOURNE.